UNITED STATES PATENT OFFICE.

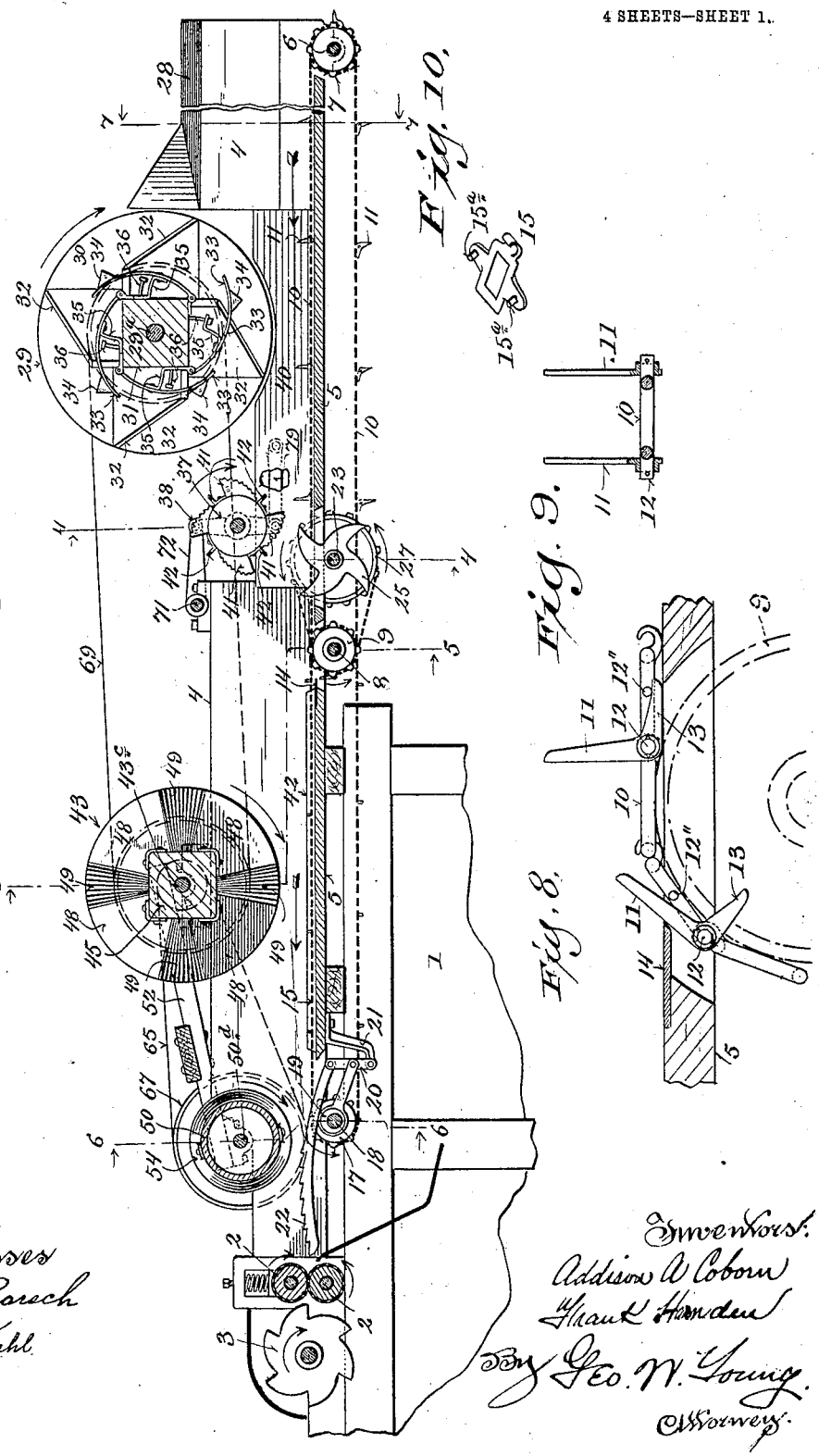

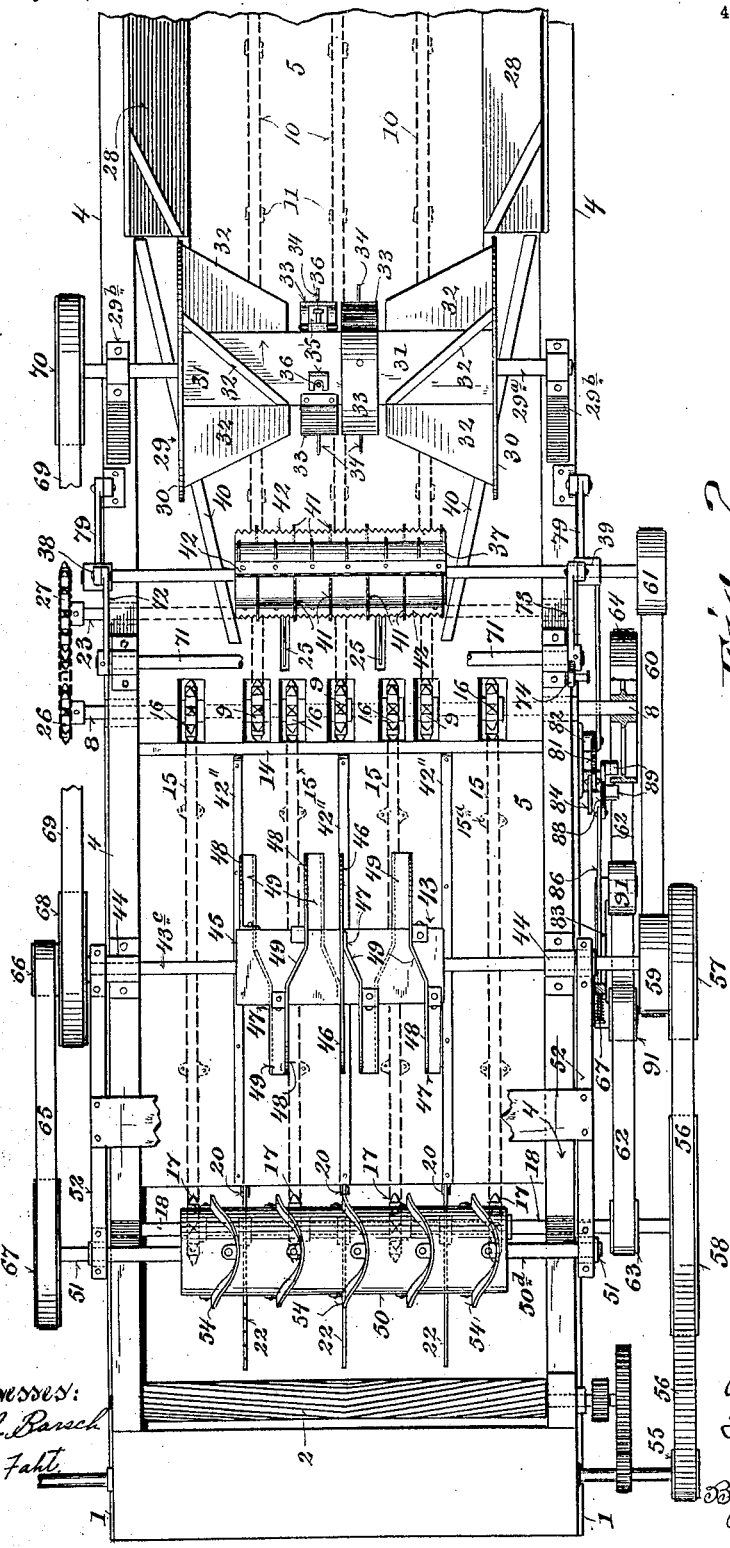

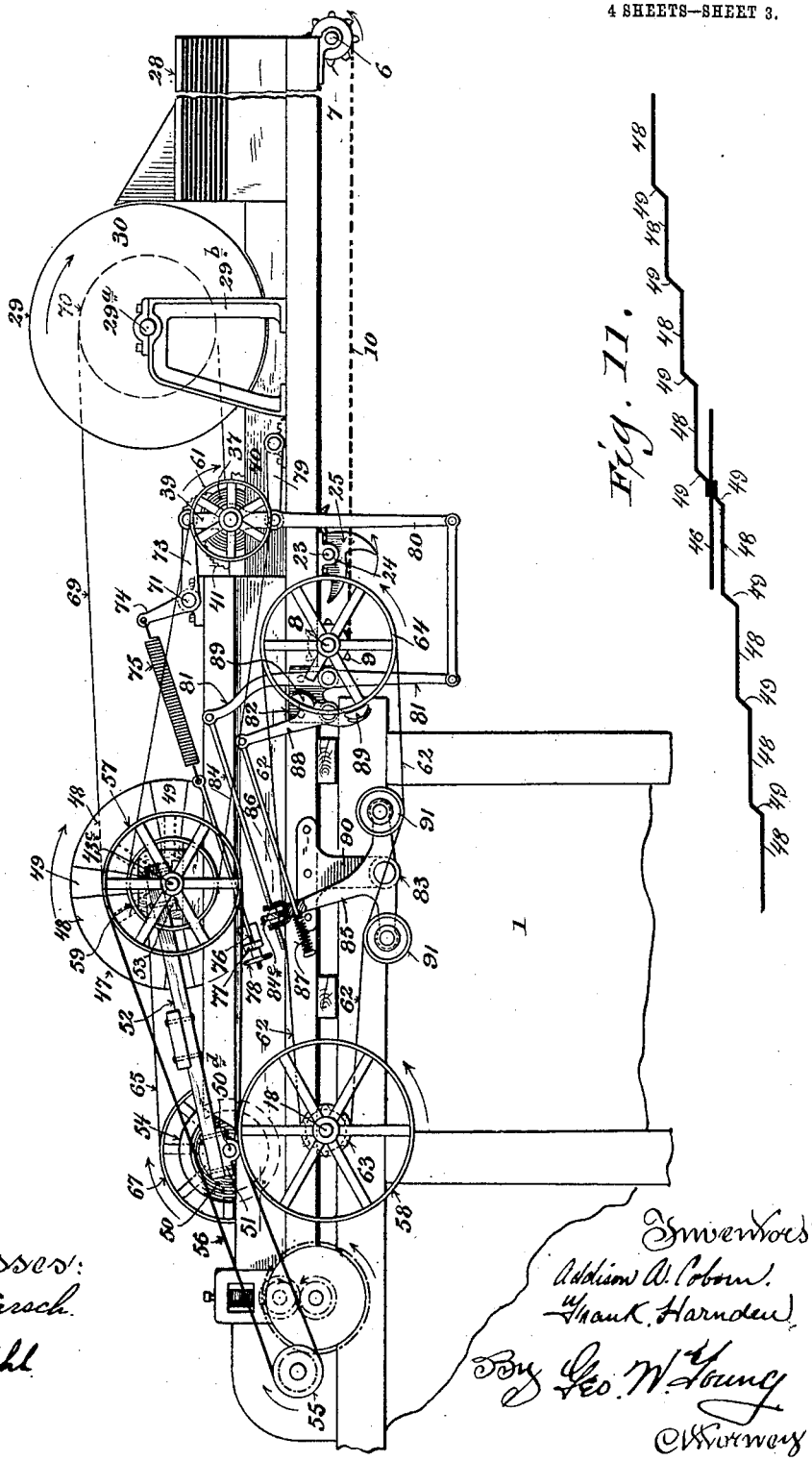

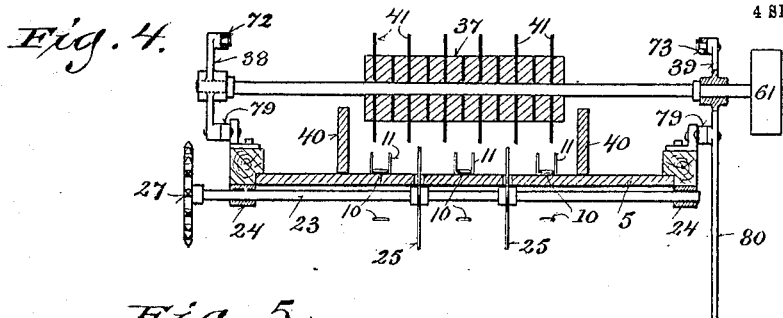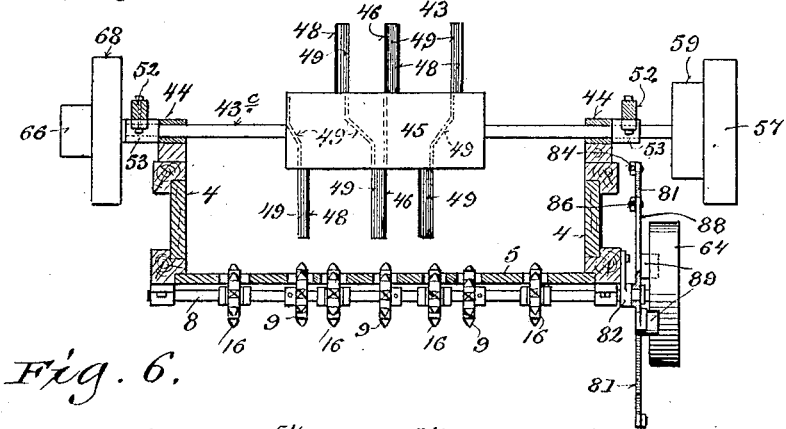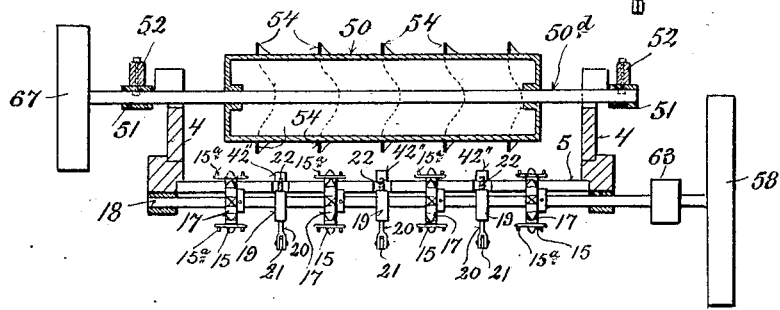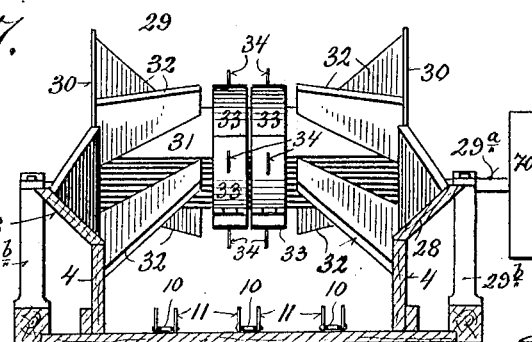

FRANK HARNDEN, OF PALMYRA, AND ADDISON A. COBURN, OF COLD SPRING, WISCONSIN.

FEEDER AND BAND-CUTTER FOR GRAIN.

No. 913,696.     Specification of Letters Patent.     Patented March 2, 1909.

Application filed March 28, 1904. Serial No. 200,477.

*To all whom it may concern:*

Be it known that we, FRANK HARNDEN and ADDISON A. COBURN, citizens of the United States, residing, respectively, at Palmyra and Cold Spring, in the county of Jefferson and State of Wisconsin, have invented a new and useful Improvement in Feeders and Band-Cutters for Grain, of which the following is a specification.

Our invention relates to improvements in band cutting and feeding attachments for threshing machines, shredders, etc.

One object of our invention is to provide improved means for gathering and alining the bundles of stalks or straw upon a feeding conveyer and concentrating them along a narrow line of feed where they are subjected to the action of band cutting devices.

Another object of our invention is to divide the feeding operation into two stages, of which the initial stage includes the gathering and band cutting mechanism above referred to, operated in connection with a conveyer having feed regulating mechanism for intermittently stopping its motion when the feed is excessive, while the second or final stage includes a constantly moving conveyer operating in connection with a set of distributing and forcing devices to deliver the stalks or straw to the shredder or thresher.

In the following description reference is had to the accompanying drawings in which,—

Figure 1 is a vertical longitudinal section of a feeder embodying our invention, illustrating the same attached to a corn shredder. Fig. 2 is a plan view of the same with parts in section and parts broken away to better illustrate our invention. Fig. 3 is a side elevation of said machine, showing the driving mechanism. Fig. 4 is a cross-section of the same on line 4—4 of Fig. 1. Fig. 5 is a cross-section on line 5—5 of said figure, and Figs. 6 and 7 are sections drawn on lines 6—6 and 7—7 respectively of Fig. 1. Figs. 8 and 9 are detailed views of one of the chains and the spurs connected thereto. Fig. 10 is a perspective view of another chain link. Fig. 11 is a diagrammatic view illustrating the flights of the "spreader".

Referring by numerals to the drawings, 1 is the casing of a portion of a shredder to which, in this instance, we have shown our improved feeder attached, and 2—2 are the snapping rollers working in the usual manner in connection with the shredder blades 3. Secured to the upper sills of said shredder is the box or feed trough of our device, having side walls 4—4 and a floor 5.

The initial conveyer comprises the shafts 6 and 8 provided with sprocket wheels 7 and 9 respectively, over which feed chains 10 are passed as shown, the chains 10 having spurs 11. Said spurs, (as best illustrated in Figs. 8 and 9), are pivoted to studs 12, the extensions 13 of the spurs serving to hold them in an upright position while traveling rearward upon the table, and when the drive sprockets 9 are reached they strike a plate 14 on the floor, which causes them to fold back against stop 11 on the chains, just before they pass under the said floor, thus freeing themselves easily from the stalks at this point. The stalks are then delivered to the second set of conveyer chains 15, which travel at a greater speed than the chains 10, and are also provided with links having ears and pins 15$^a$, projecting upward so as to catch the material and feed it forward. The discharge chains 15 revolve over sprockets 16, loosely mounted upon the shaft 8, and are driven by sprockets 17 secured to a shaft 18, which revolves in bearings attached to the trough near the discharge end thereof; also mounted upon the shaft 18 are a series of eccentrics 19, which are in strap connection with rock arms 20 that are pivoted in brackets 21 secured to the trough floor, and to the upper end of said rock arms are pivoted bars 22 having their upper surfaces serrated. These bars rest upon the eccentrics, which causes them to feed forward and upward towards the snapping rolls, and as the floor terminates at this point the said bars serve to bridge over the open space and catch and feed to the snapping rollers any stalks which may have become crossed.

Adjacent to the shaft 8 and between it and shaft 6 is a shaft 23 which is hung in bearings 24 beneath the floor of the feed trough; this shaft carries a pair of revoluble band cutting knives 25, the blades of which are in the form of half crescents with their convex margins extending in the opposite direction from their travel and projecting up through the floor, which is slotted for this purpose; these band cutters are driven from the shaft 8 by sprockets 26 and 27, the latter being of much greater diameter, thus revolving the cutters at a very slow speed with relation to the feed chains, so that the bundles are drawn by the conveyer against the cutting blades, which thus enter the bundles between the stalks and sever the bands.

The side walls of the feed end or hopper section of the trough are provided with flaring top strips 28 so as to more readily deflect the stalks into place when thrown into the feeder; and placed at the front end of the hopper section and above the initial conveyer where the flared strips terminate, is a revoluble gathering reel 29, which is driven at a comparatively high speed, its shaft being journaled in brackets 29$^b$. The reel 29 is formed with circular heads 30 mounted upon a square hub 31, and secured to the heads and hub are a series of wings 32, which taper inwardly from the head and at the same time are set at an angle having their inner ends inclining away from the direction of travel. This construction is desirable for the reason that as the stalks are fed, they may come to the reel projecting in all directions, but as soon as they are caught by the reel, the blades 32 will draw them inwardly and rearwardly and tend to straighten and concentrate them along a longitudinal line on the conveyer. In order to get a positive upper feed and also to cut the bindings, we have provided the reel with two series of segmental beaters 33, which are horizontally hinged at one end to the hub 31, and secured to the outer faces thereof are V shaped band cutters 34; these beaters, when the reel is in motion, are thrown out at their free ends, the movement being limited by slotted straps 35 striking the heads of the stop pins 36 which are fast on the hub 31 as best shown in Figs. 1 and 2 of the drawings. Thus it will be seen that the beaters will strike the bundle from above, and while feeding it forward, will, at the same time cut any bands which their knives 34 may contact with, and advance the upper stalks, thus tending to separate the bundles longitudinally. The beaters are free to yield inwardly so as to compensate for a greater or less quantity of stalks or other material.

A floating band cutter and feeding roll 37 having its shaft journaled in yokes 38 and 39 is placed over the initial conveyer at the rear of the reel 29 but is of less width than the latter, and is adapted to rise and fall between side boards 40, which converge from a point where the hopper section of the feeder terminates and serves to choke or draw the material into as small a space as practicable, so that in passing under the combined feed roller and band cutter 37, and over the lower band cutters 25 (which are approximately directly under the former) the material will be subjected to knives both above and below to insure the cutting of the bands.

The combined feed roller and band cutter 37 is composed of several rows of staggered knives 41, the cutting edges of which are curved backwardly from the direction of travel and are also serrated, and between the rows of knives there is secured to the roller a number of longitudinal feeding strips 42 running the entire length thereof, and serrated for the purpose of facilitating the feed. By reason of the short knives on the band cutters, (both top and bottom) and the yielding features, we are enabled to cut the bands without in any way shelling or cutting the ears of corn, which is a very desirable result.

The several parts described above all operate in conjunction with the feed chains 10 of the initial conveyer, and the stalks, after leaving the combined feed roller and band cutter, are delivered upon the high speed discharge chains 15 in a comparatively compact mass. It is desirable to spread said stalks in a thin layer before they enter the snapping rolls. The trough at the discharge end is therefore widened out for this purpose, and a spiral spreader 43 is placed therein, and in order to keep the stalks length-wise of said trough, we preferably place cleats 42″ upon the bottom or floor so as to form longitudinal guides. The spiral spreader 43 has its shaft 43$^c$ hung in bearings 44 secured to the side walls 4—4 of the feed trough. The hub 45 of said spreader is preferably squared in cross-section, and secured thereto is a central divider disk 46, and to the latter is fastened at either side, but diametrically opposite, the inner ends of a right and left hand spiral 47—47, the flights of which are made up of straight portions 48, alternating with abrupt angular portions 49, (see Fig. 11 of the drawings). By this construction the edges of the straight portion of the spirals will enter between the stalks without disturbing them but each time an angular portion enters, it will cause said stalks to be moved towards one side wall of the trough, thereby spreading or agitating the entire mass with each revolution of the spreader. The flights of the spreader move in the stalks in the direction of the feed.

The stalks having been spread out in a thin layer, it is only necessary to compress them slightly and give a lateral or wabble motion to them as they enter the snapping rolls; this is usually done when a shredder is fed by hand so as to cause the snapping rolls to take hold of the stalks. In our machine we accomplish the same result by means of a compressor or revoluble floating drum 50 having its shaft 50$^d$ hung in suitable boxes 51 secured to the outer ends of arms 52, which are in turn loosely mounted by means of boxes 53 upon the spreader shaft 43$^c$; the said drum 50 is provided with a series of circumferential ribs 54 bent in the form of an O. G. curve or wave for the purpose of obtaining a lateral movement of the corn stalks as the latter pass into the snapping rolls, the drum as illustrated being located near the same, and over the bars 22.

The entire mechanism of our device is driven from the shredder shaft (as best illustrated in Fig. 3 of the drawing) through a pulley 55; and a pulley 57 fast to the spreader shaft 43ᶜ. The belt also contacts with and drives another pulley 58 upon the shaft 18, which in turn drives the sprocket wheels carrying chains 15; another pulley 59 on the spreader shaft drives through its belt 60 a pulley 61 fast to the shaft of the band cutter and feed roller 37, and motion is imparted to the feed chains 10 by means of a belt 62 running over a small pulley 63 on the drive shaft 18, and a large pulley 64 fast upon the driving shaft 8.

The snapping rolls form no part of our invention. They are driven from the shredder shaft by a series of gears in the usual manner.

The compressor drum 50 is driven by a belt 65 running from a pulley 66, fast on the spreader shaft, and over a pulley 67 secured to the compressor shaft, and by reason of the arms 52 being pivoted upon the shaft 43ᶜ of the spreader, said compressor is free to rise and fall without in any way affecting the tension of its belt 65; another pulley 68 fast to the shaft 43ᶜ of the spreader drives a belt 69 which travels over a pulley 70 fast to the reel shaft 29ᵃ, thereby imparting motion to the reel, and for convenience, the two belts just mentioned are placed upon the opposite side of the machine from those previously described.

One of the important features of our invention is the device for automatically controlling the feed, this control being secured entirely in the initial feeding stage and in connection with the conveyer chains 10, the operation of the feeding devices in the second stage being permitted to continue without interference. The feed regulation is accomplished through feed roller 37, the yokes 38 and 39 of which are connected at their upper ends to a rock shaft 71 by arms 72 and 73, the said shaft being suitably journaled upon the upper edge of the side walls of the frame. The arm 73 has an angular extension 74 to which is fastened a counter-balance spring 75, which has tension adjustment by means of a rod 76 secured thereto and passing through an ear 77 fast to the side wall of the frame; the free end of said rod is threaded and provided with a hand wheel 78. The yokes 38 and 39 below the shaft of the feed roller 37 are connected to the frame by straps 79 and the yoke 39 is provided with an extension 80, which is linked to one arm of a lever 81 fulcrumed in a bracket 82 upon the frame; the other arm of this lever is coupled to a belt tension pallet 83 by a rod 84, its ends being threaded and passing through an adjustment wheel 84ᶜ which rests in a spanner of an operating arm 85 of said belt tightener. The aforesaid arm is also bored out to receive another rod 86. This rod extends outward and is threaded to receive a nut; a compression spring 87 is interposed between said nut and the arm 85 of the belt tension pallet so as to permit of a slight yield and adjustment, and the other end of the rod is fastened to a brake lever 88 fulcrumed in the bracket 82 and provided with brake shoes 89 adapted to engage the inner and outer faces of the feed chain drive pulley 64.

The belt tension pallet 83 is pivoted to a hanger 90 secured to the frame, and at either end of the cross arm is mounted a roller 91 in the path of the belt 62 which runs over one of the said rollers and under the other.

Having described the several parts of the automatic feed controlling attachments, it will be readily understood, that when the band cutter and feed roller are lifted to a certain degree by reason of the bulk of stalks passing under it, owing to its linked connection, it will not slacken its driving belt as the shaft of said feed roller rises practically on a straight line with relation to the spreader shaft 43ᶜ from which it gets its drive; but the yokes will be rocked slightly owing to the arc described by the arm 72, 73, and straps 79, causing a corresponding increased motion at the end of the extension 80 of yoke 39, thereby moving the lever 81 and through its connection releasing the tension upon belts 62; this motion at the same time forces the operating arm 85 against spring 87 on the rod 86, which draws the shoes of the brake lever 88 upon the faces of the pulley 64 and retards or checks its momentum, together with the motion of the feed chains 10 and all further feeding of the stalks in the initial stage is checked or retarded from below until a sufficient quantity has been drawn off the top of the bulk by the reel beaters and band cutter or feed roller 37 to allow the latter to drop, when the parts will assume their normal or working position and the feed chains 10 will again be set in motion. The rate of feed from the initial to the final stage will therefore remain substantially constant at the maximum capacity of the distributing mechanism.

While we have shown and described the automatic controlling device in connection with the peculiarly combined feed roller and band cutter, it is obvious that without departing from the spirit of our invention, we may attach the device to a plain roller; also for some purposes in grain feeders we may dispense with the compression drum and spreader, using only the combined floating feed roller, band cutter, and reel in connection with the automatic controller and the feed chains 10.

Having thus described our invention what we claim as new and desire to secure by Letters Patent is,

1. In a machine of the described class, the combination of a set of revolving conveyers arranged to successively carry the material, driving mechanism arranged to transmit motion at successively increasing speed to the conveyers of said set, stalk distributing devices for the second conveyer, a superposed governing and distributing roller, arranged in operative relation to the initial and relatively slow moving conveyer, and adapted to be lifted by the material thereon, connections actuated by said roller for releasing said conveyer from the driving mechanism when the roller is lifted, said driving mechanism being arranged to constantly actuate the governing and distributing roller, a set of guide boards arranged above the front end portion of the slowly moving conveyer and converging toward its longitudinal center and toward the central portion of the governing roller, a rotary gatherer disposed above said conveyer and between the guide boards, and a band cutter interposed between the gatherer and the governing roller substantially at the rear end of said guide boards.

2. In a machine of the described class, the combination of a feeding conveyer; a rotary gatherer located above the same and comprising end walls having wings extending inwardly therefrom and backwardly with reference to the direction of rotation; said gatherer being adapted to collect and aline the material carried by the conveyer.

3. In a machine of the described class, the combination of a feeding conveyer; a rotary gatherer located above the same and having tapering wings extending inwardly from its ends and backwardly with reference to the direction of rotation; and band cutting devices in the rear of the central portion of the gatherer; said gatherer being adapted to collect and aline the material carried by the conveyer.

4. In a machine of the described class, the combination of a feeding conveyer; a rotary gatherer located above the same and having wings extending inwardly from its ends and backwardly with reference to the direction of rotation; and band cutting devices in the rear of the central portion of the gatherer; said gatherer being adapted to collect and aline the material carried by the conveyer; together with a set of beaters having hinged connection with the central portion of the gatherer and trailing in a direction opposite that of rotation.

5. In a machine of the described class, the combination of a feeding conveyer; a rotary gatherer located above the same and having tapering wings extending inwardly from its ends and backwardly with reference to the direction of rotation; and band cutting devices in the rear of the central portion of the gatherer; said gatherer being adapted to collect and aline the material carried by the conveyer; together with a set of beaters having hinged connection with the central portion of the gatherer and trailing in a direction opposite that of rotation, said beaters being provided with band cutting blades.

6. In an automatic feeder and band cutter the combination of a driven feed and discharge series of chains; a gathering reel disposed above the first named series; a combined floating band cutter and feed roll adjacent to the reel, and over said feed series of chains; a revoluble spiral spreader over the discharge series of chains; a floating compression drum suspended from the spreader shaft, and driving mechanism connected to the spreader shaft and floating compression roll, substantially as set forth.

7. In a feed and band cutter attachment for corn shredders, the combination of a driven feed series and driven discharge series of chains, or belts; a revoluble gathering reel provided with blades and having a series of yielding beaters attached thereto located above the feed series of chains; a combined floating band cutter and feed roller adjacent to the reel and over said feed series of chains; a revoluble spiral spreader provided with flights having alternate straight and off-set portions located over the discharge series of chains; a compression drum provided with waved flanges and adapted to be placed adjacent to the snapping rolls of said shredder, substantially as set forth.

8. In a feed and band cutter attachment for corn shredders, the combination of a traveling series of feed conveyers and a traveling series of discharge conveyers; a gathering reel provided with yielding beaters above the feed chains; a combined floating band cutter and feed roller, means connecting said roller and driven feed chains whereby the motion of the latter is controlled; a revoluble band cutter located below the said floating band cutter and feed roller; a revoluble spiral spreader provided with flights having alternate straight and off-set portions in its circumference located above the discharge chains; a compression drum provided with a plurality of circumferential, waved flanges arranged above the discharge chains and adapted to be placed adjacent to the snapping rolls of the corn shredder, substantially as set forth.

9. In a feeder, the combination of a floating roller, a shaft for the same; yokes having bearings for said shaft; arms connecting said yokes and a rock shaft above the floating rollers; and straps connecting said yoke to the frame below said floating rollers; a link connecting one of the yokes; a lever fulcrumed to the feeder frame; a tension device provided with rollers adjustably connected to the free arm of said lever; a plurality of endless feed chains; driving sprockets mounted upon a shaft for said chains; a pulley secured to one end of the sprocket shaft; a belt for said pulley adapted to contact with the aforesaid rollers of the tension device; and a brake connected to the latter and adapted to impinge upon the face of said pulley, substantially as set forth.

10. In a grain feeder, the combination with a conveyer, of a gatherer having a hub; circular heads secured to the ends thereof; inwardly tapering blades projecting from the heads at an angle to the axial line of the hub and connected with the latter; a series of radially curved beaters hinged to the hub; stops for said beaters; and knives secured to the outer faces of the latter, substantially as set forth.

11. In a feeder and band cutter attachment for corn shredders, the combination of a feed hopper; endless feed chains therefor; a reel located at the discharge end of the hopper; an upper yielding feed roller and band cutter adjacent to said reel; a lower band cutter adapted to work in conjunction with the upper cutter; a spiral spreader, adapted to receive the grain from the band cutters; a floating compression drum adapted to receive the grain from the spreader; another set of endless feed chains arranged to operate in conjunction with the first named set of feed chains; whereby the grain is taken up and carried to the discharge end of the feeder, substantially as set forth.

12. The combination with a feeding conveyer; of a superposed rotary member; a plurality of beating wings pivotally connected to said member at their inner ends, and provided with knives at their free ends; and devices for limiting the outward movement of the beater wings.

13. In a machine of the described class, the combination of a feeding conveyer; a set of inwardly and rearwardly inclined guide boards, disposed above the conveyer; and a rotary device provided with gathering wings located above the conveyer between the divergent end portions of the guide boards; together with a set of band cutting devices arranged to operate between the converging end portions of the guide boards.

In testimony whereof we have signed our names to this specification in the presence of two subscribing witnesses.

FRANK HARNDEN.
ADDISON A. COBURN.

Witnesses:
HENRY CARY,
JENNIE COLEMAN.